United States Patent Office 2,991,616
Patented July 11, 1961

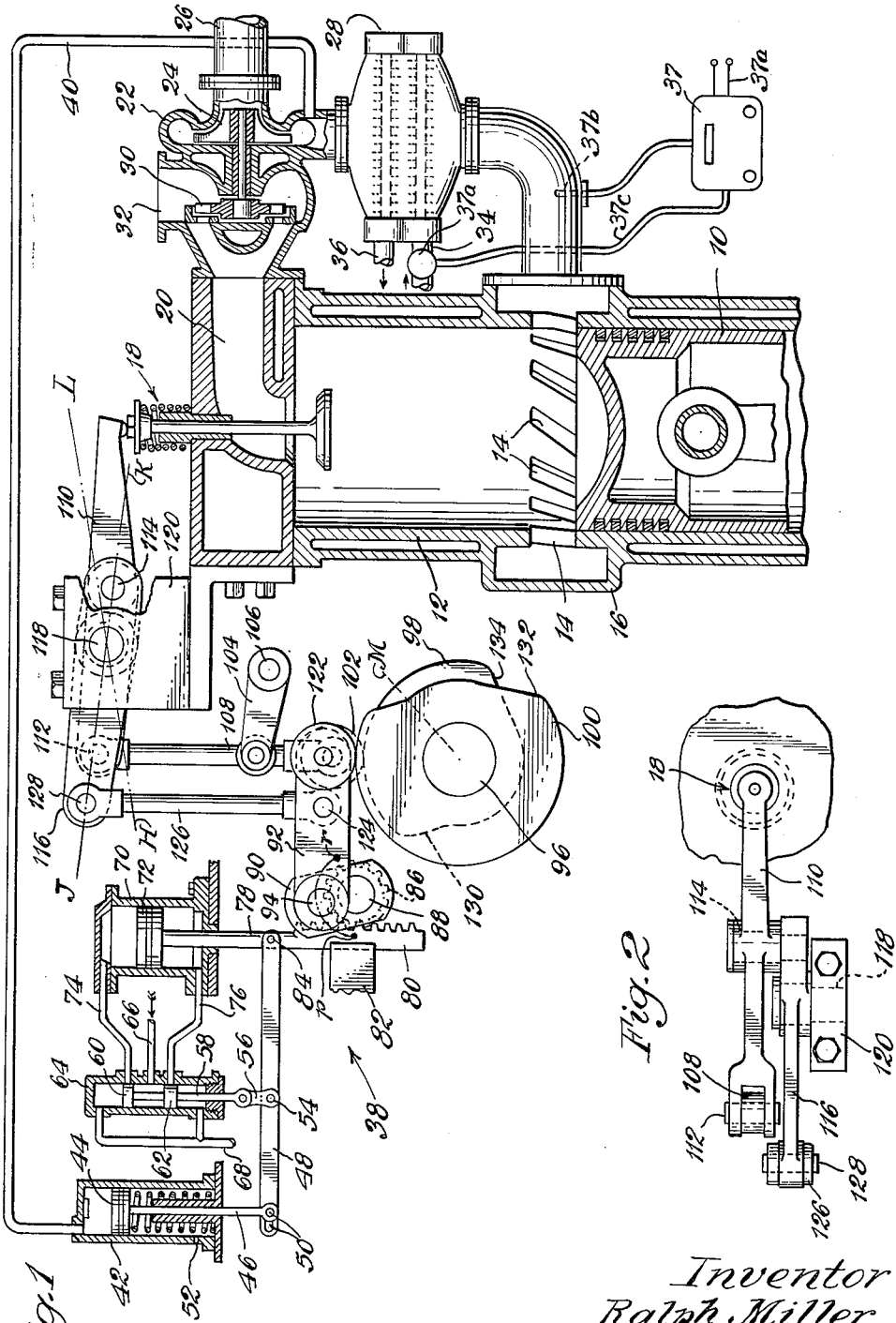

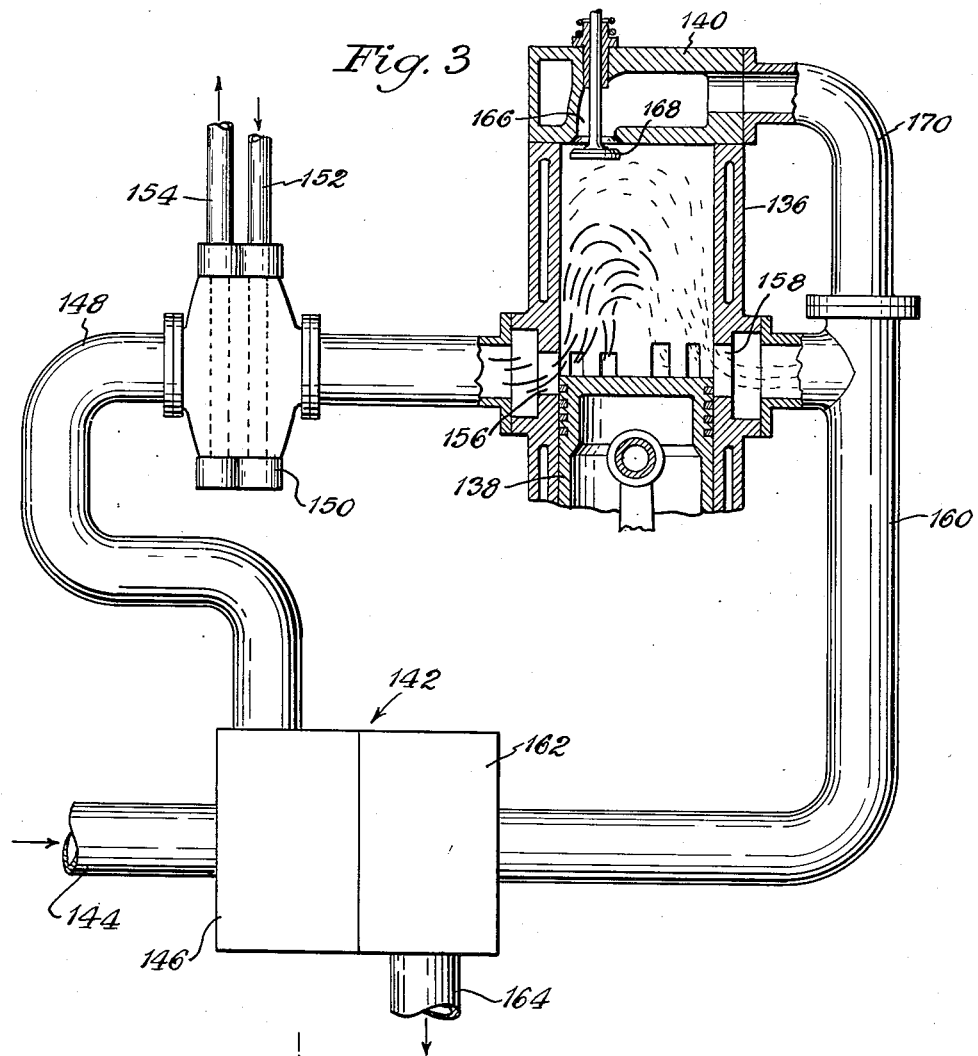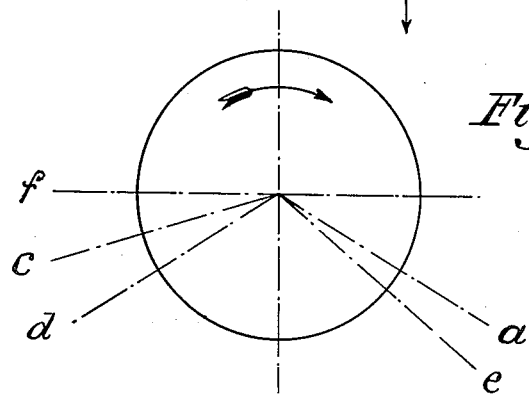

2,991,616
SUPERCHARGED INTERCOOLED TWO STROKE CYCLE ENGINE WITH COMPRESSION CONTROL VALVE
Ralph Miller, 1943 N. Summit Ave., Milwaukee 2, Wis.
Filed Dec. 16, 1953, Ser. No. 398,579
4 Claims. (Cl. 60—13)

This is a continuation-in-part of application Serial No. 166,418, filed June 6, 1950, now abandoned.

My invention resides in the field of internal combustion engines and is an improved method and apparatus for obtaining an increased output from previously known engines.

Engine developers are continuously seeking new ways to increase the output of engines, either by new methods of operation or by the use of various auxiliary apparatus; and two primary factors always have to be considered, namely, excessive pressures and excessive temperatures in the cylinders during the engine cycle. For many years, the high pressures existing in the cylinders have been effectively dealt with by simply making an engine more sturdy, particularly in permanent installations. However, high temperatures constitute a more difficult problem as the materials of the engine will not stand temperatures above a certain upper limit, regardless of the sturdy construction of the engine. This problem has proved especially difficult on two-stroke cycle engines for the reasons to follow.

One well-known method of increasing the output of a two-stroke cycle internal combustion engine is by the addition of a supercharger which compresses the inlet air to an elevated temperature and pressure before it passes into the cylinders through the scavenging ports, thus increasing the density of the air and allowing for the burning of a greater quantity of fuel. This increases the output of the engine generally in proportion to the increased density of the air, but it suffers the disadvantage of increasing the mechanical loads on the engine, due to the increased pressures, and it increases the thermal loads, due to the increased temperature of the inlet air. A highly supercharged engine must therefore be sturdier than its non-supercharged equivalent.

The temperature of the intake air from a supercharger to the scavenging ports is even more important than the pressures. If the engine operates at high supercharging pressures, the temperature of the charging air will be higher. This causes the compression temperature of the air at the end of the compression stroke to be higher, and the final combustion temperature will also be higher. It can be seen that by using a supercharger all temperatures in the engine cycle will be increased and the thermal stresses on the engines can easily become excessive if the supercharging pressure is raised beyond a certain upper limit.

Because of these excess temperatures, it is desirable to remove the excess heat from the charging air to lower its temperature, and this has been done by the use of various types of intercoolers, all of which cool the charging air before it enters the cylinders through the scavenging ports. Many types of intercoolers are well known, and they have been used effectively to decrease the thermal loads on highly supercharged engines.

One of the fundamental problems in two stroke cycle engines is properly scavenging the cylinder of burnt gases and charging it with cool inlet air between each expansion and compression stroke when the piston uncovers the scavenging ports. Normally the scavenging air enters through approximately half of the ports in the cylinder wall, loops up through the top of the cylinder, and exhausts through the other half of the ports in the cylinder wall.

I have devised a method and apparatus for compressing the inlet air by a supercharger, preferably a turbocharger, cooling the air to an approximately constant temperature for all loads on the engine, supplying the cooled compressed air to the cylinder through all of the scavenging ports in the cylinder wall between an expansion and compression stroke when the piston has uncovered the ports, providing an exhaust valve in the cylinder head to exhaust all of the burnt gases from the cylinder, and varying the time of closing of this exhaust valve after the piston has covered the scavenging ports so that the temperature rise in the cylinders due alone to compression will vary inversely as the load. To do this, the time of closing of the exhaust valve in the cylinder head must be advanced during the engine cycle as the load decreases and retarded as the load increases. Thus, a larger temperature rise, due to the burning of the fuel, can be allowed while the final combustion temperature can remain below the allowable upper limit. In summary, more fuel can be burned, and such a two-stroke cycle engine will have a higher output.

From the above, it can be seen that one of the primary objects of my invention is a new method of operating a given sized two-stroke cycle engine that will substantially increase its output without increasing its mechanical or thermal loads.

Another object of my invention is a new method of operating a given sized two-stroke cycle engine that will substantially increase its output by the use of conventional auxiliary equipment, such as superchargers, intercoolers, modified cylinder heads, and the like, all of which are individually old and well known.

Another object of my invention is a modified form of engine of the two-stroke cycle type which gives substantially increased output, this form having the conventional inlet and exhaust ports in the cylinder wall and an auxiliary valve and port for the cylinder head communicating with the exhaust ports, the time of closing of the auxiliary valve during the compression stroke being such that the temperature rise in the cylinders due alone to compression will vary in inverse relation to the load on the engine. The time of closing of the auxiliary valve is retarded as the load increases and advanced as the load decreases.

Other objects will appear from time to time in the ensuing specification and drawings, in which:

FIGURE 1 is a transverse sectionl view of the two-stroke cycle engine with various auxiliary apparatus, all of which in combination makes up my invention;

FIGURE 2 is a top plan view of the valve actuating mechanism shown in FIGURE 1;

FIGURE 3 is a view similar to FIGURE 1 of a modified form of the two stroke cycle engine shown in that figure;

FIGURE 4 is a valve timing diagram for the exhaust valve for the engine in FIGURE 1 or the auxiliary valve for the engine in FIGURE 3.

Figure 5:
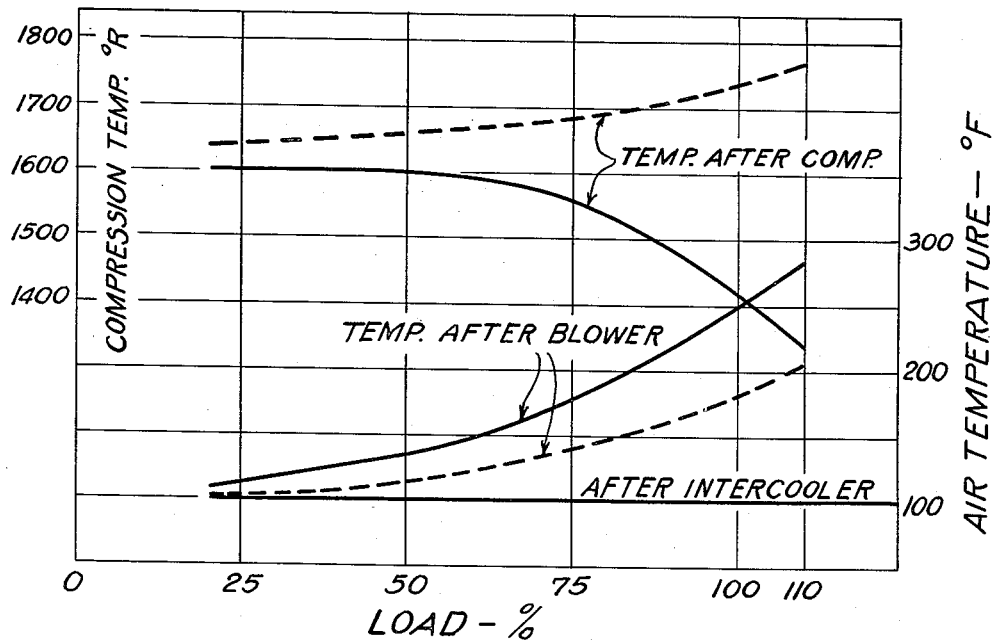
FIGURE 5 is a chart or diagram showing the various temperatures in a conventional two stroke cycle engine, in broken lines, for a complete range of loads, and superimposed thereon, in full lines, the same temperatures in my engine.

In FIGURE 1 I have shown a two stroke cycle engine of the uniflow type having a piston 10 and a cylinder 12. The cylinder has a collection of scavenging ports 14 that are spaced all the way around the cylinder with the usual scavenging belt 16. In the head of the piston is an exhaust valve mechanism 18 which controls an exhaust port 20. A turbocharger 22 has a blower or fan 24 which draws air into an inlet 26 and discharges it under high pressure to an intercooler 28 where it is cooled to an approximately constant temperature for all loads.

From the intercooler the charging air passes to the scavenging belt and the scavenging ports 14. An exhaust turbine 30 is driven by the exhaust gases from the cylinder and any conventional exhaust outlet 32 is provided. The piston is shown in a position where it allows scavenging air from the scavenging belt 16 to flow into the cylinder through the scavenging ports 14.

The intercooler 28, as stated above, is the type that gives a constant temperature for the charging air for all loads on the engine, and the cooling fluid has an inlet connection, indicated generally at 34, adjacent the cold air outlet, and an outlet 36 adjacent the warm air inlet. To maintain a constant inlet temperature of the inlet air from the intercooler, I may control the intercooler in any suitable manner. For example, I may have a controller 37, either air or electrically operated, in this case electrically. The controller may be supplied with current by a suitable connection 37a. A temperature sensing probe 37b may be positioned in the inlet manifold or inlet connection between the intercooler and the engine. The controller senses the temperature of the air after the intercooler, and if it varies from a predetermined temperature, a signal is sent by a suitable lead 37c to a solenoid control valve 37d in the inlet connection 34 to the intercooler. The controller, thus, automatically increases or reduces the amount of water, or whatever cooling medium is used, in the intercooler to keep the temperature of the air to the engine approximately constant. I have shown the controller as electrically operated, but it should be understood that air operated controllers are quite conventional. In the case of an air operated unit, the temperature probe would sense the inlet manifold temperature and the controller would increase or decrease the pressure of an air signal to an air motor which in turn would open or close the valve in the inlet line 34. This is to say that any suitable arrangement for controlling the intercooler so that it automatically supplies a constant temperature charging air to the cylinder may be used.

A valve control mechanism, indicated generally at 38, is one of many that could be used or could be made to function in this manner, and the specific details form no part of this invention. The details of the one illustrated are as follows: The pressure of the air between the blower 24 and the intercooler 28 will be proportioned to the load, and a pipe 40 conveys this variable pressure to a cylinder 42 so that the pressure acts against a spring loaded piston 44. If the pressure is high (at full load), the piston 44 will be forced downwardly, and if the pressure is low (at light load), the piston will move upwardly. A piston rod 46 on the piston 44 is connected to a link 48 through a pin and slot connection 50. The lower side of the piston 44 is vented to the atmosphere at 52. The link 48 is pivotally connected at 54 to a link 56 which is pivotally connected to the stem 58 of a pair of piston valves 60 and 62 which reciprocate in a cylinder 64. A source of high pressure hydraulic fluid is in communication with the cylinder 64 through any suitable connection, indicated generally at 66, and the high pressure hydraulic fluid is admitted between the piston valves 60 and 62. A fluid discharge 68 has branches connected at both ends of the cylinder so that hydraulic fluid from the system can be returned to the low pressure side of the fluid system. Another cylinder 70 with a piston 72 has appropriate pipe connections 74 and 76 to the cylinder 64 so that both sides of the piston 72 are selectively in communication with the high pressure hydraulic source through the cylinder 64. The piston rod 78 for the piston 72 has a rack 80 formed at its lower end to reciprocate in any suitable guide means 82, and the link 48 is also pivoted to the piston rod 78 at 84. The rack is in meshing engagement with a pinion 86 which is mounted on a shaft 88. This shaft carries a crank 90 which is connected to a rocker arm 92 by a pivot 94. When the valve 18 is open the gases in the cylinder are allowed to escape through it at such a rate that the upward movement of the piston does not increase the pressure in the cylinder. Nor is the valve 18 open too wide so that the pressure in the cylinder will escape to the exhaust and the supercharging will be lost.

A cam shaft 96 is driven from the engine crank shaft in a conventional manner and is fitted with a valve opening cam 98 and a valve closing cam 100. A cam follower roller 102 bears on the cam 98, being held in that position by a pair of rocker arms 104 which are arranged to oscillate on a shaft 106. A connecting rod 108 is attached to a valve lever arm 110 by a pivot 112. The arm 110 oscillates on a journal 114 which is integral with a lever 116, the latter being free to oscillate on a journal 118 carried on a fixed bracket 120. A cam follower roller 122 bears on the cam 100 and is carried on the rocker arm 92. This rocker arm oscillates on the pivot 94 carried on the crank 90. The other end of the arm 92 is connected by a pivot 124 to a connecting rod 126, the upper end of which is connected to the lever 116 by a pivot 128. FIGURE 4, line a, indicates the angular position of the crank at which the upward portion 130 of the cam 98 starts to move the follower roller 102 upwardly to open the valve 18 at the end of the expansion stroke of the piston. The journal 114 on the lever 116 is in its lowermost position on line J—K in FIGURE 1, while the cam follower roller 122 is on top of the circular part of the cam 100.

With the pivot 94 on the crank 90 in the mid-position, as shown in FIGURE 1, rotation of the cam shaft 96 will cause the roller 122 to drop to the base circle of the cam 100 when the line M is vertical. This movement will raise the journal 114 on the lever 116 to a position indicated by the line H—L. The valve-actuating end of the lever 110 is thus lifted away from the valve 18 so that it is closed by its spring in a conventional manner.

With the pivot 94 in the mid-position as shown, the valve 18 will close at c in FIGURE 4. By rotating the crank 90, the pivot 94 can be advanced to the position p, causing the valve 18 to close at d, which is the position in which the piston closes the scavenging ports 14 in FIGURE 1. This is the no-load position. If the crank 90 is rotated in the opposite direction so that the pivot 94 is placed in the position r, the valve will close later in the upstroke of the piston as at f in FIGURE 4, this being the full-load position. The line a indicates the opening of the valve 18 and also the time that the piston uncovers the exhaust ports 14.

When the cam follower roller 122 is lifted again by the upward portion 132 of the cam 100, the roller 102 is moved downwardly at the same rate, following the downward portion 134 of the cam 98. The valve 18 thus remains closed until the upward portion 130 lifts the roller 102.

The shaft 88 could be controlled by any factor of the engine indicative of the load—for example, by the fuel pump or the governor. The shaft 88, however, is most easily operated automatically to vary the closing angle of the valve 18 in accordance with the superecharging air pressure by mechanism similar to the automatic control mechanism 38 in FIGURE 1.

In FIGURE 3, I have shown a modified form of my invention in which a two stroke cycle engine is shown with a cylinder 136, a piston 138, and a cylinder head 140. A supercharger, indicated generally at 142, has an air intake 144, a supercharging blower 146, and an intake manifold 148. An intercooler 150 is positioned in the manifold and is of the type that provides an approximately constant temperature for the outlet air to the engine. The cooling fluid is circulated to the intercooler, as indicated generally by the connection 152, and is withdrawn by the connection 154.

The cylinder has the usual inlet ports 156 on one side of the cylinder wall and exhaust ports 158 on the other side, it being understood that the number and disposition of the inlet and exhaust ports is a matter of design. The exhaust ports extend slightly above the inlet ports so that at the end of the expansion stroke of the piston the exhaust ports will be uncovered first by the piston. Thus, the high pressures will be relieved to the exhaust manifold 160 before the inlet ports are uncovered. The hot exhaust gases are conveyed to the exhaust turbine 162 where they drive the blower 146 and exhaust through any conventional exhaust port 164.

The cylinder head 140 has an auxiliary port 166 and auxiliary valve 168 positioned therein, this port communicating with the exhaust manifold through a conduit 170. This valve is adapted to open and close the port so as to regulate the point during the compression stroke of the piston at which compression begins. At the higher loads, the valve 168 stays open after the piston 138 has closed the inlet and exhaust ports 156 and 158 for a short period of time, and the time of closing of the auxiliary valve is changed in accordance with the load by a valve timing mechanism similar to the one indicated in FIGURE 1 at 38. As the load increases, the time of closing of the auxiliary valve 168 will be retarded during the enegine cycle, and it will close later and later toward the line f in FIGURE 4. As the load decreases, the time of closing of the auxiliary valve will be advanced during the engine cycle and it will close earlier and earlier toward line d in FIGURE 4. The auxiliary valve stays open after the piston has closed the inlet and exhaust ports so that a part of the compressed cooled air in the cylinder is exhausted to the exhaust manifold by the conduit 170. The piston opens the exhaust ports at line a and the inlet ports at line e in FIGURE 4 on the power stroke.

The auxiliary port 166 and valve 168 are not necessarily used to air scavenging, and a normal scavenging loop can be formed in the cylinder when the piston uncovers the exhaust and inlet ports. The auxiliary valve is merely used to vary the time at which compression begins in the cylinder during the normal compression stroke. However, it is obvious that they will aid scavenging.

In FIGURE 5, I have illustrated the temperatures both in my engine and in a conventionally supercharged engine for a full range of loads. The broken lines indicate the various temperatures for a conventional engine while the solid lines indicate the corresponding temperatures in an engine that operates according to my invention. Three very important aspects of the invention can be observed from this chart. First, the temperature of the entering air after the turbocharger (Temp After Blower) is much higher in my engine (solid lines) than in a conventional engine (broken lines); second, the temperature of the entering air after the intercooler (After Intercooler) is approximately constant in my engine for all loads; and third, the temperature of the air at the end of compression (Temp After Comp), which is just prior to combustion, increases as the load increases in a conventional engine (broken lines), but in my engine (solid lines) this temperature decreases as the load increases. It can therefore be seen from this chart that a greater temperature rise due alone to the burning of the fuel can be accomplished in my engine than in a conventional engine as the load increases without exceeding the upper temperature limits of the material because in my engine the temperature of the air at the time of fuel injection (Temp After Comp) is lower than in a conventionally supercharged engine. Obviously then, if more fuel can be burned, more load can be carried.

The use, operation and function of my invention are as follows:

In my two-stroke cycle engine, I employ an exhaust driven turbocharger which supplies highly compressed air to the engine. If the load is high, the pressure of the air from the turbine is high; and if the load is low, the pressure of the air supply from the turbine is low. This turbine is indicated in FIGURE 1 generally at 22. The highly compressed air is then passed through an intercooler which withdraws the heat of compression and cools the air to an approximately constant temperature for all loads. This means that the air enters the engine cylinder through the scavenging ports 14 at an approximately constant temperature, regardless of the load, and this intercooler is indicated generally at 28 in FIGURE 1.

In FIGURE 1, the valve 18 is closed at variable times during the compression stroke of the piston by the valve control mechanism 38. It will be understood that the valve control mechanism 38 provides for a variable time of closing and a substantially constant time of opening of the valve 18.

In the species of FIGURE 3, after the piston 138 has covered both the inlet and exhaust ports during the compression stroke, the auxiliary valve 168 in the cylinder head stays open for a short period of time so that the compression stroke does not begin until a later time in the engine cycle. A portion of the cooled air in the cylinder is exhausted to the exhaust manifold through the conduit 170. The time of closing of the auxiliary valve is varied in accordance with the load, the time of closing being retarded as the load increases and advanced as the load decreases. The time of opening of the auxiliary valve can be constant, and it could vary.

Whereas, I have shown and described a preferred form and one modification of my invention with various details of each, it should be understood that numerous alterations, modifications and substitutions can be made without departing from the essential theme, and I wish that the invention be unrestricted except by the appended claims.

I claim:

1. In a two stroke cycle internal combustion engine of the compression ignition port scavenged type, a cylinder and cylinder head, a piston movably mounted in the cylinder to define compression and expansion strokes, a plurality of inlet and exhaust ports in the wall of the cylinder to provide for the entrance of inlet air and the exhaustion of burnt gases from the cylinder, an auxiliary port and valve for the cylinder for rejecting air from the cylinder that would normaly be entrapped when the piston covers the inlet and exhaust ports on its compression strokes, an exhaust driven supercharger for compressing the inlet air, an intercoller in communication with the compressor for cooling the air to a substantially reduced temperature, means for supplying the compressed cooled air to the inlet ports to scavenge the cylinder and charge it with compressed cool air, actuating means for the auxiliary valve including means for closing the auxiliary valve during the compression stroke of the piston after the piston has closed the ports in the cylinder wall, and means for actuating the auxiliary valve in accordance with the load on the engine so that a greater amount of cool air will be rejected from the cylinder at the heavier loads and a lesser amount will be rejected at the lighter loads.

2. The structure of claim 1 in which the intercooler is constructed and arranged to cool the air to an approximately constant outlet temperature at all loads.

3. The structure of claim 1 further characterized in that the auxiliary port and valve are in communication with the exhaust ports so that the rejected air will flow to the exhaust.

4. The structure of claim 1 further characterized in that the actuating means for the auxiliary valve includes means for varying the time of closing of the auxiliary valve in accordance with the load on the engine, and for keeping the time of opening of the auxiliary valve approximately constant as load varies on the engine.

(References on following page)

References Cited in the file of this patent

UNITED STATES PATENTS

| | | |
|---|---|---|
| 981,952 | Lintz | Jan. 17, 1911 |
| 1,046,738 | Cross | Dec. 10, 1912 |
| 1,100,975 | Harrington | June 23, 1914 |
| 1,330,496 | Ruegg | Feb. 10, 1920 |
| 1,371,444 | Sherbondy | Mar. 15, 1921 |
| 2,097,883 | Johansson | Nov. 2, 1937 |
| 2,292,233 | Lysholm | Aug. 4, 1942 |
| 2,293,548 | Johansson | Aug. 18, 1942 |
| 2,306,950 | Jacoby et al. | Dec. 29, 1942 |
| 2,431,563 | Johansson | Nov. 25, 1947 |
| 2,509,246 | Ramsey | May 30, 1950 |
| 2,565,681 | Fleck et al. | Aug. 28, 1951 |
| 2,670,595 | Miller | Mar. 2, 1954 |

FOREIGN PATENTS

| | | |
|---|---|---|
| 818,526 | France | June 21, 1937 |
| 420,032 | Great Britain | Nov. 23, 1934 |
| 566,531 | Great Britain | Jan. 3, 1945 |

OTHER REFERENCES

"Internal Combustion Engines" (Lichty), published by McGraw-Hill Book Company, Inc. (New York), 1951, pages 465 and 466 relied on.